United States Patent
Hayashi et al.

(10) Patent No.: US 7,582,358 B2
(45) Date of Patent: Sep. 1, 2009

(54) ORGANIC-INORGANIC COMPOSITE FORMING MATERIAL, ORGANIC-INORGANIC COMPOSITE, PRODUCTION METHOD THEREOF AND OPTICAL ELEMENT

(75) Inventors: Nobuhiko Hayashi, Osaka (JP); Mitsuaki Matsumoto, Hirakata (JP); Keiichi Kuramoto, Kadoma (JP); Masaya Nakai, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 307 days.

(21) Appl. No.: 11/637,126

(22) Filed: Dec. 12, 2006

(65) Prior Publication Data
US 2007/0149700 A1 Jun. 28, 2007

(30) Foreign Application Priority Data
Dec. 22, 2005 (JP) ............................. 2005-369966
Oct. 25, 2006 (JP) ............................. 2006-290036

(51) Int. Cl.
*B32B 9/04* (2006.01)
*C08G 77/20* (2006.01)

(52) U.S. Cl. ..................... 428/447; 528/26; 528/32; 528/43

(58) Field of Classification Search .................. None
See application file for complete search history.

(56) References Cited

U.S. PATENT DOCUMENTS

| | | | |
|---|---|---|---|
| 4,906,686 A * | 3/1990 | Suzuki et al. | 524/730 |
| 6,917,475 B2 * | 7/2005 | Shiga et al. | 359/642 |
| 2005/0106400 A1 * | 5/2005 | Kuramoto et al. | 428/447 |

FOREIGN PATENT DOCUMENTS

| | | |
|---|---|---|
| JP | 2005-298796 A | 10/2005 |
| WO | WO 02/088255 A1 | 11/2002 |

* cited by examiner

*Primary Examiner*—David Wu
*Assistant Examiner*—Vu Nguyen
(74) *Attorney, Agent, or Firm*—NDQ&M Watchstone LLP

(57) ABSTRACT

An organic-inorganic composite forming material which contains an organometallic polymer having an -M-O-M- bond (M denotes a metal atom), an acrylic monomer or oligomer having a hydrophilic group and inorganic particles. Preferably, the organometallic polymer has Si in the place of M and is obtained via hydrolysis and polycondensation of trialkoxysilane having a photo- or thermally-polymerizable group and dialkoxysilane having a phenyl group.

12 Claims, 3 Drawing Sheets

ORGANIC-INORGANIC COMPOSITE FORMING MATERIAL, ORGANIC-INORGANIC COMPOSITE, PRODUCTION METHOD THEREOF AND OPTICAL ELEMENT

BACKGROUND OF THE INVENTION

1. Technical Field

The present invention relates to an organic-inorganic composite forming material which can be used as a material for optical elements such as lenses, diffraction gratings, optical waveguides and light-emitting elements, an organic-inorganic composite and a production method thereof, and an optical element using the organic-inorganic composite.

2. Description of Related Art

Camera-mounted mobile telephones and digital cameras increasingly demand resin-made aspherical lenses or composite aspherical lenses.

The composite aspherical lens is a lens which carries a resin lens having an aspherical shape on a glass lens. Since a thickness of the resin portion is about several hundred micrometers and smaller than that of the resin-made aspherical lens, the composite aspherical lens undergoes a smaller change under the influence of temperature and shows a superior heat resistance compared to the resin-made aspherical lens. The composite aspherical lens in a mobile telephone is required to exhibit a high environment resistance, e.g., withstand a heat at about 150° C. Also, the resin must be photo-curable in order to prevent curing shrinkage that may occur during a process where the resin is cured on the glass lens. Even in the case where the composite aspherical lens uses a high-refractive index glass lens, its overall thickness must be reduced in order to reduce the size or thickness of a device. Accordingly, although a choice of a material quality of the glass lens is important, a refractive index of the resin portion itself must also be increased.

There is a method for increasing the index of refraction of the resin by mixing high-refractive, fine oxide particles in the resin. International Publication No. WO 02/088255 discloses an organic-inorganic hybrid polymer material as a heat-resisting resin, which is obtained by incorporating metal oxide particles in an organic polymer having a metal alkoxy group. However, in International Publication No. WO 02/088255, the organic-inorganic hybrid polymer material is synthesized by melt blending. Accordingly, if the composite aspherical lens is to be fabricated using this polymer material, the resin portion must be formed on the glass lens by heat processing. Also, neither the heat resistance required for the composite aspherical lens nor an optical resin having a high refractive index is described.

Japanese Patent Laid-Open No. 2005-298796 proposes an optical resin which uses a resin obtained via hydrolysis and polycondensation of alkoxysilane and contains fine particles of a metal oxide such as niobium oxide. In order to increase a refractive index of the optical resin, such fine particles of metal oxide may need to be incorporated in a large amount. However, no description is provided with regard to a method for dispersing them in a stable fashion. When those fine particles of metal oxide are incorporated in a large amount, they hold together to form agglomerates that scatter a light and, as a result, cause clouding of the resin, which is a problem.

SUMMARY OF THE INVENTION

It is an object of the present invention to provide an organic-inorganic composite forming material which can be formed into a transparent, high-refractive index organic-inorganic composite, an organic-inorganic composite, a method for production of the composite, and an optical element using the composite.

The organic-inorganic composite forming material of the present invention is characterized in that it contains an organometallic polymer having an -M-O-M- bond (M denotes an metal atom), an acrylic monomer or oligomer having a hydrophilic group, and inorganic particles.

In accordance with the present invention, the hydrophilic groups of the acrylic monomer or oligomer surround the inorganic particles to effectively prevent agglomeration thereof. This accordingly restrains clouding that results from agglomeration of the inorganic particles, making it possible to form a transparent and high-refractive organic-inorganic composite. Therefore, the use of this material can result in the formation of a heat-resisting, high-refractive index organic-inorganic composite which is suited, for example, to form a resin portion of a composite aspherical lens for use in camera-mounted mobile telephones and others.

In the present invention, M in the -M-O-M- bond in the organometallic polymer is preferably Si, Ti, Bn or Zr, or any combination thereof. Si is particularly preferred. In case M is Si, the organometallic polymer is preferably obtained via hydrolysis and polycondensation of a silane compound having a photo-polymerizable or thermally-polymerizable group (first silane compound) such as trialkoxysilane and another silane compound having a phenyl group (second silane compound) such as dialkoxysilane. Examples of such photo- or thermally-polymerizable groups are acryloxy, methacryloxy, styryl and vinyl. Polymerizing the organometallic polymer if obtained from an organometallic forming material comprising the silane compound (first silane compound) such as trialkoxysilane and the other silane compound (second silane compound) such as dialkoxysilane can result in the formation of an organic-inorganic complex which exhibits a resistance to heat at 200° C. or above.

Examples of silane compounds having a photo- or thermally-polymerizable group (first silane compounds) include vinyltrimethoxysilane, vinyltriethoxysilane, 2-(3,4-epoxycyclohexyl)ethyltrimethoxysilane, 3-glycidoxy-propyltrimethoxysilane, 3-glycidoxypropylmethyldiethoxy-silane, 3-glycidoxypropyltriethoxysilane, p-styryl-trimethoxysialne, 3-methacryloxypropyltrimethoxysilane, 3-methacryloxypropylmethyldimethoxysilane, 3-methacryloxy-propyltrimethoxysilane, 3-methacryloxypropylmethyldiethoxysilane, 3-methacryloxypropyltriethoxysilane and 3-acryloxypropyltrimethoxysilane. Examples of silane compounds having a phenyl group (second silane compounds) include phenyltriethoxysilane, phenyltrimethoxysilane, diphenyl-dimethoxysilane and diphenyldiethoxysilane.

In case trialkoxysilane is used, it is hydrolyzed during the synthesis process to produce three hydroxyl groups. Out of them, two participate in polymerization and one remains as a hydroxyl group. This hydroxyl group is hydrogen bonded to the inorganic particle. As a result, hydroxyl groups surround the inorganic particles to effectively prevent agglomeration of such inorganic particles.

The use of the dialkoxysilane can result in the formation of a high-refractive organic-inorganic composite, because it has two phenyl groups.

Examples of inorganic particles for use in the present invention include fine particles of metal oxides such as $Nb_2O_5$, $TiO_2$, $CeO_2$, $ZrO_2$, $SnO_2$ and ZnO. Inorganic particles having a mean particle diameter of up to 100 nm, so-called nanoparticles, are particularly preferably used. The use of $Nb_2O_5$, $TiO_2$, $CeO_2$ and $ZrO_2$ particles, among those metal oxide fine particles, are particularly preferred for their ability to provide superior transparency and high refractive index. For each type of the aforementioned inorganic particles, its refractive index and transmission wavelength (wavelength band in which light absorption is small) are listed below.

$Nb_2O_5$ (refractive index=2.3, transmission wavelength=0.35-9 μm)

$TiO_2$ (refractive index=2.2-2.7, transmission wavelength=0.35-12 μm)

$CeO_2$ (refractive index=2.2, transmission wavelength=0.4-16 μm)

$ZrO_2$ (refractive index=2.1, transmission wavelength=0.35 μm or above)

$SnO_2$ (refractive index=1.9, transmission wavelength=0.35-1.5 μm)

$ZnO$ (refractive index=2.1, transmission wavelength=0.4-16 μm)

The acrylic monomer or oligomer for use in the present invention has a hydrophilic group. The use of such an acrylic monomer or oligomer having a hydrophilic group successfully prevents formation of cracks and restrains clouding that occurs when the inorganic particles are incorporated in a large quantity. Examples of hydrophilic groups include hydroxyl, carboxyl and amino groups. Particularly preferred is a hydroxyl group.

Examples of acrylic monomers having a hydroxyl group include water-soluble monomers such as 2-hydroxyethyl methacrylate, 2-hydroxypropyl methacrylate and triethylene glycol dimethacrylate. An example of the acrylic monomer having an amino group is 2-dimethylaminoethyl methacrylate.

The oligomer for use in the present invention is an oligomer of the aforementioned acrylic monomer. Examples of such oligomers include dimers and trimers of the above-listed acrylic monomers.

Also, the acrylic monomer in the present invention includes acrylates and methacrylates having a hydrophilic group.

The organic-inorganic composite forming material of the present invention comprises an organometallic polymer, an acrylic monomer or oligomer, and inorganic particles. It preferably comprises 33-95% by weight of an organometallic polymer, 4-17% by weight of an acrylic monomer or oligomer and 1-50% by weight of inorganic particles. The proportions by weight of these components are given by values as they total 100% by weight. The organic-inorganic composite forming material may have a composition which, other than the above-specified components, further contains a polymerization initiator, light stabilizer or UV absorber, for example.

The organometallic polymer is preferably contained in the amount of 33-95% by weight, as described above, and more preferably 33-65% by weight. If the organometallic polymer content is excessively low, insufficient mechanical strength may result. On the other hand, if the organometallic polymer content is excessively high, a relative amount of the inorganic particles decreases. This may result in the failure to obtain a high refractive index.

In the case where the organometallic polymer is derived from the first and second silane compounds, as described above, a blending proportion by weight of the first and second silane compounds is preferably within the range of 50:50-25:75. If the first silane compound constitutes an excessively large proportion of the blend, the relative amount of the second silane compound becomes small. Then, a refractive index of the resulting organometallic polymer becomes relatively low. This may lead to the failure to obtain a high-refractive organic-inorganic composite. On the other hand, if the first silane compound constitutes an excessively small proportion of the blend, a mechanical strength or heat resistance of the resulting organic-inorganic composite may be reduced.

The acrylic monomer or oligomer is preferably contained in the amount of 4-17% by weight, as described above. The excessively smaller amount of the acrylic monomer or oligomer increases the occurrence of agglomeration of the inorganic particles. This in some cases causes clouding. On the other hand, the excessively larger amount of the acrylic monomer or oligomer may result in the reduction in heat resistance of the organic-inorganic composite.

The inorganic particles are preferably contained in the amount of 1-50% by weight, as described above, more preferably in the range of 5-50% by weight. The excessively smaller amount of the inorganic particles makes it more difficult to obtain a high refractive index. By contrary, the excessively larger amount of the inorganic particles increases a viscosity of the organic-inorganic composite forming material. This increases a possibility that the material entrains air bubbles or the like when it is processed.

The organic-inorganic composite of the present invention is characterized in that it is obtained via polymerization of the organic-inorganic composite forming material of the present invention. That is, the organic-inorganic composite of the present invention is a polymerized and cured product of the organic-inorganic composite forming material.

The optical element of the present invention is characterized in that it uses the above-described organic-inorganic composite of the present invention. The optical element can be illustrated by an optical lens, diffraction grating, hologram element, prism element, antireflection multilayer film, waveguide element or the like.

The optical device of the present invention is characterized in that it uses the optical element of the present invention. Examples of optical devices include optical communication devices such as optical switches, optical transmitter and receiver modules and optical couplers; display devices such as liquid crystal displays, plasma displays, organic EL displays and projectors; optical parts such as microlens arrays, integrators and light guides; cameras such as digital cameras; image pickup devices such as video cameras; image pickup modules such as CCD camera modules and CMOS camera modules; and optical apparatuses such as telescopes, microscopes and magnifying glasses.

The production method of the present invention is a method by which the organic-inorganic composite of this invention can be produced and is characterized as comprising, in sequence, polymerizing an organometallic polymer forming material in a dispersion of inorganic particles to form an organometallic polymer, and adding an acrylic monomer or oligomer to allow polymerization thereof with the organometallic polymer.

In accordance with the production method of the present invention, a transparent high-refractive organic-inorganic composite can be produced.

In the case where the organometallic polymer is obtained via hydrolysis and polycondensation of the first and second silane compounds, the first and second silane compounds are hydrolyzed and polycondensed in a dispersion of the inorganic particles. After addition of the acrylic monomer or oligomer, polymerizable groups in trialkoxysilane are allowed to polymerize with polymerizable groups in the acrylic monomer or oligomer so that crosslink bonds are formed. As a result, the organic-inorganic composite is provided.

In accordance with the production method of the present invention, the organometallic polymer and the acrylic monomer or oligomer are polymerized in the dispersion of the inorganic particles. Accordingly, the organic-inorganic composite can be produced while the inorganic particles are well dispersed. As a result, a transparent and high-refractive organic-inorganic composite can be obtained.

In accordance with the present invention, an organic-inorganic composite is provided which is high in heat resistance, refractive index and transparency and is accordingly suitable, for example, as a material for a resin portion of a composite aspherical lens for use in camera-mounted mobile telephones and others.

DESCRIPTION OF THE PREFERRED EXAMPLES

Figure 1:
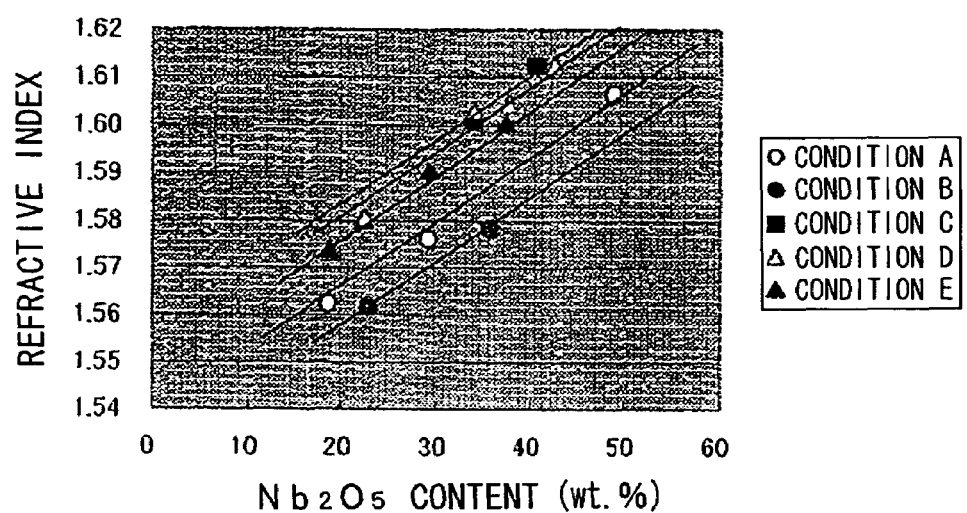
FIG. 1 is a graph which shows the $Nb_2O_5$ content vs. refractive index for examples of an organic-inorganic composite in accordance with the present invention.

The present invention is below described in more detail by way of examples which are not intended to be limiting thereof.

In the following examples and comparative examples, the below-listed dispersions of metal oxide nanoparticles were used for the inorganic particles.

(Dispersion of $Nb_2O_5$ Nanoparticles)

Product name: BYLAL AC-20E (product of Taki Chemical Co., Ltd., dispersion in ethanol, containing 20% by weight of the nanoparticles having a mean particle diameter of 10 nm)

(Dispersion of $TiO_2$ Nanoparticles)

Product name: TYNOC SAM-01 (product of Taki Chemical Co., Ltd., dispersion in isopropyl alcohol, containing 20% by weight of the nanoparticles having a mean particle diameter of 6 nm)

Examples 1-14 and Comparative Examples 1 and 2

(1) Methacryloxypropyltrimethoxysilane (MPTMS) and diphenyldimethoxysilane (DPhDMS) were added dropwise to a dispersion of $Nb_2O_5$ nanoparticles while it was stirred. After stirring was continued for about 15 minutes, a mixture of 2N hydrochloric acid and ethanol at 1:1 ratio was added dropwise. The respective amounts of MPTMS, DPhDMS and $Nb_2O_5$ are specified in Table 1. After the dropwise addition, the resultant was further stirred for about 30 minutes and then allowed to stand for 72 hours, during which time MPTMS and DPhDMS underwent hydrolysis and polycondensation and thus polymerized into an organometallic polymer.

(2) 2-hydroxyethyl methacrylate (2HEMA) and a polymerization initiator (product name: IRGACURE 184), each in the amount specified in Table 1, were added to the liquid obtained in (1) and containing the organometallic polymer and the inorganic particles. The resultant, while stirred, was heated at 100° C. to remove ethanol from the liquid.

In Examples 1-14 in which 2HEMA was added, the resin retained its transparency even after ethanol was removed via evaporation from the resin. By contrast, in Comparative Examples 1 and 2 in which 2HEMA was not added, evaporation of ethanol from the resin was followed by agglomeration of the $Nb_2O_5$ nanoparticles and then clouding of the resin. Particularly, a number of agglomerates of the $Nb_2O_5$ nanoparticles were observed at and near a surface of the resin liquid.

(3) The resin liquid obtained after removal of ethanol in (2) was injected between two glass plates spaced 140 μm apart by a 140 μm thick spacer. The resin injected between the glass plates was polymerized by exposure to an ultraviolet radiation using an ultraviolet irradiator "LUV-16", manufactured by As One Corp., for 20 minutes.

After the irradiation, one of the glass plates was removed to observe the appearance of the resin after it was cured.

In Examples 1-14 in which 2HEMA was added, the resin was observed to have been cured while maintaining transparency and forming no cracks. By contrast, in Comparative Examples 1 and 2 in which 2HEMA was not added, the resin became cloudy due to light scattering caused by agglomerates of $Nb_2O_5$ nanoparticles and had a number of fine cracks formed therein. For Examples 1-14, a refractive index of each resin after cure was measured. The measurement results are shown in Table 1. For Comparative Examples 1 and 2, clouding of each resin prevented measurement of its refractive index.

TABLE 1

| | MPTMS:DPhDMS (molar ratio) | MPTMS (g) | DPhDMS (g) | $Nb_2O_5$ (g) | 2HEMA (g) | Initiator (g) | 2HEMA (wt. %) | $Nb_2O_5$ (wt. %) | Refractive Index | Condition |
|---|---|---|---|---|---|---|---|---|---|---|
| Ex. 1 | 2:1 | 0.21 | 0.10 | 0.13 | 0.21 | 0.01 | 32.0 | 18.7 | 1.562 | A |
| Ex. 2 | 2:1 | 0.21 | 0.10 | 0.22 | 0.21 | 0.01 | 27.9 | 29.2 | 1.576 | A |
| Ex. 3 | 2:1 | 0.21 | 0.10 | 0.52 | 0.21 | 0.01 | 20.1 | 48.9 | 1.606 | A |
| Ex. 4 | 2:1 | 0.21 | 0.10 | 0.22 | 0.43 | 0.01 | 43.6 | 22.8 | 1.562 | B |
| Ex. 5 | 2:1 | 0.21 | 0.10 | 0.42 | 0.43 | 0.01 | 36.3 | 35.7 | 1.578 | B |
| Ex. 6 | 1:2 | 0.11 | 0.21 | 0.19 | 0.05 | 0.01 | 9.3 | 33.8 | 1.601 | C |
| Ex. 7 | 1:2 | 0.11 | 0.21 | 0.26 | 0.05 | 0.01 | 8.3 | 40.9 | 1.612 | C |
| Ex. 8 | 1:2 | 0.11 | 0.21 | 0.13 | 0.11 | 0.01 | 19.1 | 22.4 | 1.581 | D |
| Ex. 9 | 1:2 | 0.11 | 0.21 | 0.22 | 0.11 | 0.01 | 16.3 | 34.0 | 1.603 | D |
| Ex. 10 | 1:2 | 0.11 | 0.21 | 0.26 | 0.11 | 0.01 | 15.3 | 37.8 | 1.605 | D |
| Ex. 11 | 1:2 | 0.11 | 0.21 | 0.32 | 0.11 | 0.01 | 14.1 | 42.6 | 1.613 | D |
| Ex. 12 | 1:2 | 0.11 | 0.21 | 0.13 | 0.21 | 0.01 | 32.1 | 18.8 | 1.574 | E |
| Ex. 13 | 1:2 | 0.11 | 0.21 | 0.22 | 0.21 | 0.01 | 28.0 | 29.3 | 1.591 | E |

TABLE 1-continued

| | MPTMS:DPhDMS (molar ratio) | MPTMS (g) | DPhDMS (g) | $Nb_2O_5$ (g) | 2HEMA (g) | Initiator (g) | 2HEMA (wt. %) | $Nb_2O_5$ (wt. %) | Refractive Index | Condition |
|---|---|---|---|---|---|---|---|---|---|---|
| Ex. 14 | 1:2 | 0.11 | 0.21 | 0.32 | 0.21 | 0.01 | 24.8 | 37.3 | 1.600 | E |
| Comp. Ex. 1 | 1:2 | 0.11 | 0.21 | 0.19 | — | 0.01 | — | 37.2 | Immeasurable | F |
| Comp. Ex. 2 | 1:2 | 0.11 | 0.21 | 0.26 | — | 0.01 | — | 44.6 | Immeasurable | F |

For Examples 1-14, the $Nb_2O_5$ content vs. refractive index of the cured product (organic-inorganic composite) of each organic-inorganic composite forming material was shown in FIG. 1.

As shown in Table 1 and FIG. 1, in Examples 1-14 in accordance with the present invention, transparent and high-refractive organic-inorganic composites can be obtained. As can be seen from FIG. 1, in each condition of A-E, the increasing $Nb_2O_5$ content results in obtaining the organic-inorganic composite having the higher refractive index. In accordance with the present invention, notwithstanding the incorporation of a large number of inorganic particles such as $Nb_2O_5$, transparent organic-inorganic composites can be obtained. Therefore, organic-inorganic composites having a variety of refractive indexes can be obtained by controlling the loading of the inorganic particles.

Examples 1 and 15 and Comparative Examples 3-5

The acrylic monomers specified in Table 2 were used. Also, each component was used in the amount specified in Table 2. Otherwise, the procedures (1) and (2) in the preceding Examples were followed to synthesize organic-inorganic composite forming materials. The appearance of the resin in the process of being synthesized is shown in Table 2. In Table 2, the appearance of each resin after the acrylic monomer was added and mixed is indicated in the column of "after mixing", the appearance of each resin after removal of ethanol is indicated in the column of "after removal of ethanol", and the appearance of each resin after allowed to stand for 12 hours following ethanol removal is indicated in the column of "after allowed to stand for 12 hours".

As shown in Table 2, the resins obtained in Examples 1 and 15 using a hydroxyl-containing acrylic monomer remained transparent. By contrary, the resins obtained in Comparative Examples 3-5 using a hydroxyl-free acrylic monomer became cloudy.

Example 16

The procedures (1)-(3) in the preceding Examples were followed, except that a dispersion of $TiO_2$ nanoparticles was used in place of the dispersion of $Nb_2O_5$ nanoparticles, to produce an organic-inorganic composite. In these procedures, 0.21 g of MPTMS, 0.44 g of DPhDMS, 0.52 g of $TiO_2$ nanoparticles, 0.11 g of 2HEMA, 0.02 g of a polymerization initiator, 0.2 g of a photostabilizer TINUVIN 292 and 0.04 g of an ultraviolet absorber TINUVIN 400 were used. Accordingly, 2HEMA and $TiO_2$ nanoparticles were used in concentrations of 8.2 and 33.9% by weight, respectively.

The obtained organic-inorganic composite was measured to have a refractive index of 1.63.

Example 17

Figure 2:
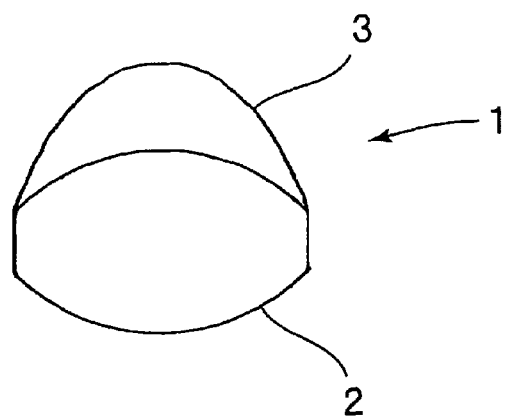
FIG. 2 is a schematic sectional view which shows a composite aspherical lens as an embodiment of an optical element in accordance with the present invention.

FIG. 2 is a schematic sectional view which shows a composite aspherical lens as an embodiment of an optical element in accordance with the present invention. As shown in FIG. 2, a composite aspherical lens 1 comprises an optical substrate 2 composed of a high-refractive glass, and a resin portion 3 formed on one surface of the optical substrate 2 and composed of an organic-inorganic composite in accordance with the present invention. Preferably, a silane coupling agent is coated onto the one surface of the optical substrate 2 on which the resin portion 3 is subsequently formed.

TABLE 2

| | MPTMS (g) | DPhDMS (g) | $Nb_2O_5$ (g) | Acrylic Monomer Type | Acrylic Monomer (g) | Initiator (g) | $Nb_2O_5$ (wt. %) | Appearance of Resin After mixing | After removal of ethanol | After allowed to stand for 12 hours |
|---|---|---|---|---|---|---|---|---|---|---|
| Comp. Ex. 3 | 0.21 | 0.1 | 0.13 | Methyl methacrylate | 0.214 | 0.01 | 19.3 | Transparent | Transparent | Cloudy |
| Comp. Ex. 4 | 0.21 | 0.1 | 0.13 | Phenyl methacrylate | 0.211 | 0.01 | 19.4 | Slightly Cloudy | Cloudy | Cloudy |
| Comp. Ex. 5 | 0.21 | 0.1 | 0.13 | Benzyl methacrylate | 0.208 | 0.01 | 19.5 | Cloudy | Cloudy | Cloudy |
| Ex. 15 | 0.21 | 0.1 | 0.13 | 2-hydroxypropyl methacrylate | 0.206 | 0.01 | 19.6 | Transparent | Transparent | Transparent |
| Ex. 1 | 0.21 | 0.1 | 0.13 | 2-hydroxyethyl methacrylate | 0.210 | 0.01 | 18.7 | Transparent | Transparent | Transparent |

As the optical substrate 2, a spherical glass lens such as comprised of an OHARA high-refractive index glass (product name "S-TIH6", refractive index=about 1.8) can be used. For example, the organic-inorganic composite of Example 7, shown in Table 1, is used to form the resin portion 3 on this spherical glass lens. In this case, the resin portion 3 has a refractive index of 1.612. Accordingly, a difference in refractive index between the optical substrate 2 and the resin portion 3, as well as a reflectance at a boundary therebetween, can be rendered smaller in this case than in cases where organic-inorganic composites (refractive index=about 1.52), free of inorganic particles, are used to form the resin portion.

Also, the resin portion can be formed on a low-price spherical glass lens by a simple process to fabricate the aspherical lens. Thus, the cost associated with fabricating the aspherical lens can be reduced.

In this Example, the composite aspherical lens is described as an embodiment of an optical element in accordance with the present invention but is not intended to be limiting thereof. Other applicable embodiments include other types of lenses, diffraction ratings, optical waveguides, and light-emitting elements.

Example 18

Figure 3:
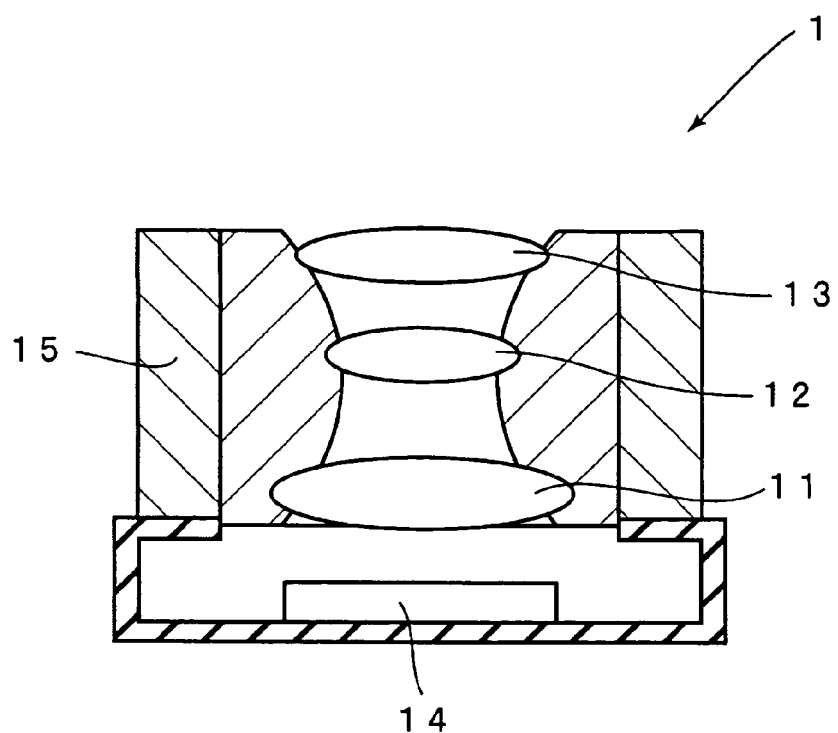
FIG. 3 is a schematic sectional view which shows a camera module as an embodiment of an optical device in accordance with the present invention.

FIG. 3 is a schematic sectional view which shows a camera module 10 using a composite aspherical lens as shown in FIG. 2. As shown in FIG. 3, three aspherical lenses 11, 12 and 13 are located above an image pickup element 14 and held in positions by an auto-focus mechanism 15. The camera module 10 having these three aspherical lenses 11-13 can be used as a 2-5 megapixel camera module for mobile telephones.

In this Example, the composite aspherical lens shown in FIG. 2 is used for the aspherical lenses 11-13. Since the composite aspherical lens shown in FIG. 2 uses the high-refractive index organic-inorganic composite of the present invention for the resin portion 3, the number of lenses, generally four, can be reduced to 3. Accordingly, the camera module of this Example can be reduced in height to about 7.5 mm.

Although the lenses 11-13 are all specified as being aspherical in this Example, not all of them need to be aspherical if the camera module design permits. At least one of them needs to be an aspherical lens. The camera module shown in FIG. 3 has a lens system comprising a combination of plural lenses, an image pickup element and a holder for retaining them. Characteristically, at least one of those plural lenses comprises the optical element of the present invention as it is used as the aspherical lens.

Conventional camera modules for mobile telephones need four lenses because an optical resin layer of each lens therein is limited in refractive index to 1.61 or below. Accordingly, their height is limited to about 10 mm.

Figure 4:
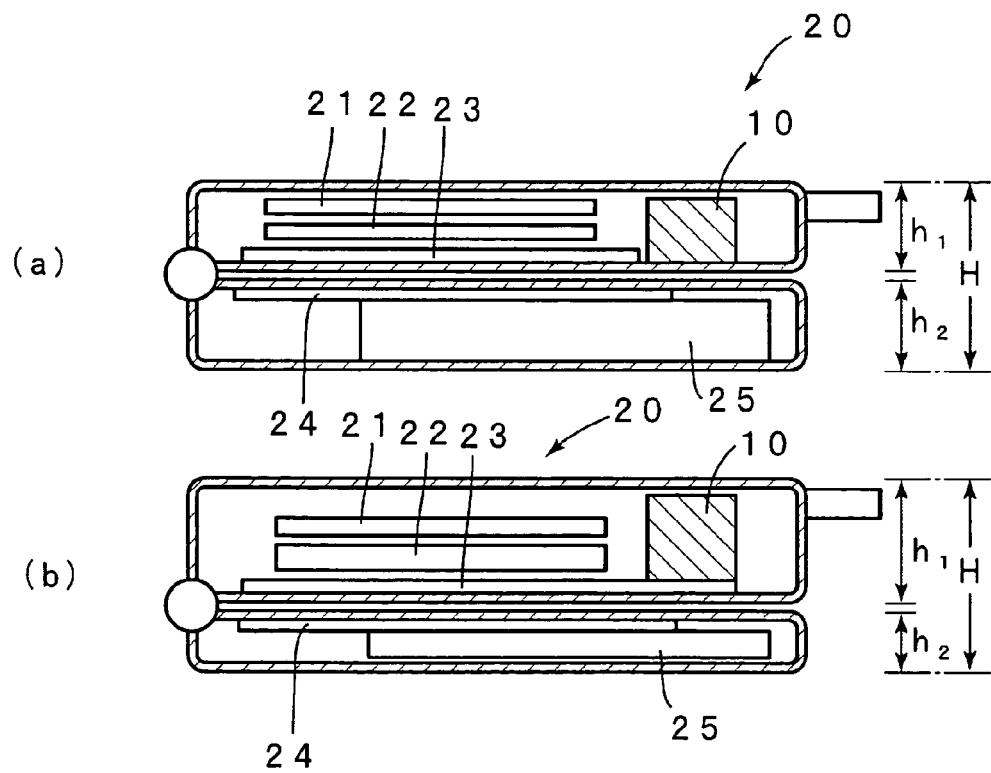
FIG. 4 is a sectional view which shows a folding mobile telephone incorporating a conventional camera module.

FIG. 4 is a sectional view which shows a folding mobile telephone incorporating a 10 mm high, conventional camera module.

The mobile telephone in a folded position, as shown in FIGS. 4(a) and 4(b), has a height H of 25 mm. In the mobile telephone shown in FIG. 4(a), a height $h_1$ of its upper section is 12.5 mm and equal to a height $h_2$ of its lower section. The upper section has a camera module 10 and accommodates a TV tuner 21, a hard disk drive 22 and a display 23. Since the upper section in FIG. 4(a) has a relatively small height $h_1$ of 12.5 mm, the camera module 10 limits an available space for the display 23 which is thus forced to reduce in size. A keyboard 24 and a battery 25 are located inside the lower section.

In the mobile telephone shown in FIG. 4(b), the upper section has a height $h_1$ of 14.5 mm and the lower section has a height $h_2$ of 10.5 mm. This design contemplates to increase the height $h_1$ of the upper section for accommodation of the display 23 of a larger size. On the other hand, the height $h_2$ of the lower section is reduced to 10.5 mm. This forces a reduction in volume of the battery 25 and accordingly lowers a battery capacity, which has been a problem.

Figure 5:
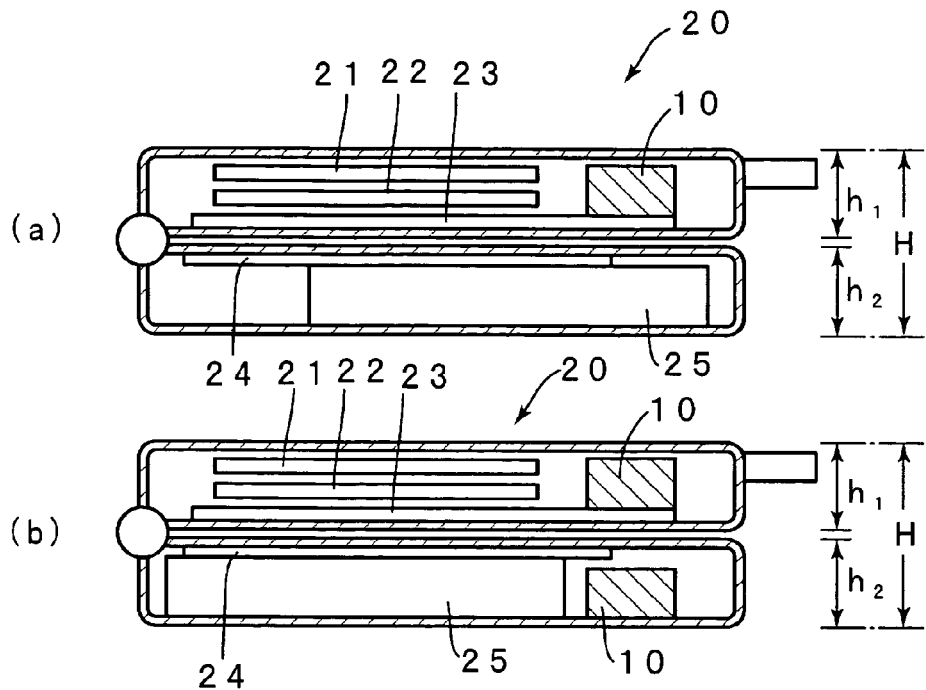
FIG. 5 is a sectional view which shows an embodiment of a mobile telephone in accordance with the present invention.

FIG. 5 is a sectional view which shows a mobile telephone as an embodiment in accordance with the present invention.

In the mobile telephones shown in FIGS. 5(a) and 5(b), a camera module 10 is incorporated as the optical device of the present invention. Since the camera module 10 of the present invention can be reduced in height, for example, to about 8 mm, a large-size display 23 can be incorporated in the upper section, as shown in FIG. 5(a), without the need to increase its height $h_1$. This allows the lower section and the upper section to have the same height $h_2$ and $h_1$ of 12.5 mm, which permits accommodation of the battery 25 of a larger capacity.

Also, the camera module 10 can be incorporated in each of the upper and lower sections, as shown in FIG. 5(b). This enables one to photograph a stereoscopic visual image or its own face with a high image quality. Other applications become possible. For example, panoramic shooting can be achieved by using plural cameras. The sensitivity can be substantially improved by electrically composing output signals from plural cameras.

Example 19

The camera module shown in FIG. 3 is also useful as a camera module of a back monitor for use in cars. The back monitor for use in cars requires durability against temperature change and can use the aspherical lens shown in FIG. 2, for example. In addition, the aspherical lens shown in FIG. 2 widens an angle of visual field because of its high refractive index.

Example 20

Figure 6:
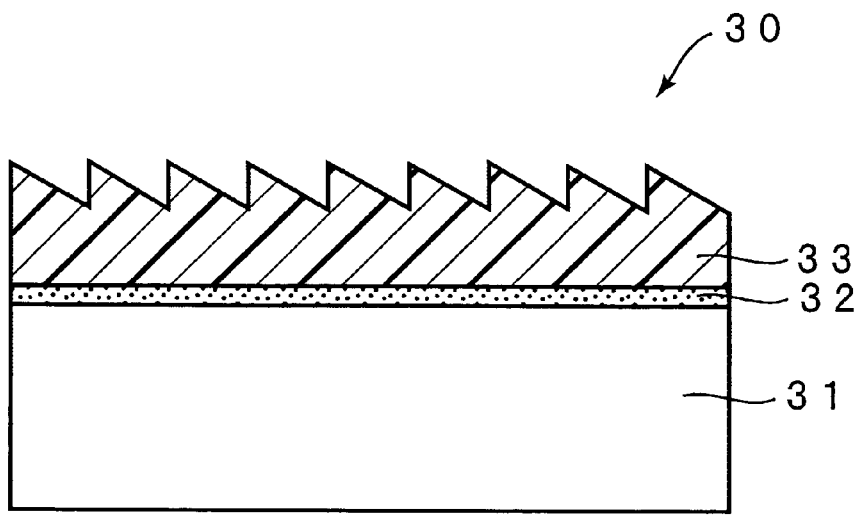
FIG. 6 is a schematic sectional view which shows a diffraction rating as another embodiment of an optical element of the present invention.

FIG. 6 is a schematic sectional view which shows a diffraction grating as another embodiment of the optical element of the present invention. A layer 32 of a silane coupling agent is formed on a glass substrate 31. A diffraction grating layer 33, made of the organic-inorganic composite of the present invention, is formed on the silane coupling agent layer 32. The silane coupling agent layer 32 can be formed by coating the silane coupling agent onto the substrate 31. The diffraction grating layer 33 can be formed by shaping the organic-inorganic composite forming material by a stamping process. The organic-inorganic composite of the present invention has a high refractive index, as described above, and thus can enlarge the diffraction grating. Therefore, it is suitable as a material for formation of a diffraction grating.

The diffraction grating 30 can be used in a wide variety of fields, e.g., in optical parts such as a light pickup, spectroscope, optical communication device and fresnel lens.

What is claimed is:

1. An organic-inorganic composite forming material consisting of an organometallic polymer having an -M-O-M- bond (M denotes a metal atom), an acrylic monomer or oligomer having a hydrophilic group, and inorganic particles composed of at least one selected from $Nb_2O_5$ and $TiO_2$.

2. The organic-inorganic composite forming material as recited in claim 1, wherein said organometallic polymer has Si in the place of M and is obtained via hydrolysis and polycondensation of a silane compound having a photo- or thermally-polymerizable group and another silane compound having a phenyl group.

3. The organic-inorganic composite forming material as recited in claim 1, wherein said organometallic polymer has Si in the place of M and is obtained via hydrolysis and polycondensation of trialkoxysilane having a photo- or thermally-polymerizable group and dialkoxysilane having a phenyl group.

4. The organic-inorganic composite forming material as recited in claim 1, wherein said hydrophilic group in the acrylic monomer or oligomer is a hydroxyl group.

5. The organic-inorganic composite forming material as recited in claim 1, consisting of 33-95% by weight of the organometallic polymer, 4-17% by weight of the acrylic monomer or oligomer, and 1-50% by weight of the inorganic particles.

6. An organic-inorganic composite obtained via polymerization of the organic-inorganic composite forming material as recited in claim 1.

7. An optical element comprising the organic-inorganic composite as recited in claim 6.

8. An optical device comprising the optical element as recited in claim 7.

9. A method for production of the organic-inorganic composite as recited in claim 6, comprising the steps of polymerizing an organometallic polymer forming material in a dispersion of said inorganic particles to form the organometallic polymer, adding said acrylic monomer or oligomer to allow polymerization with the organometallic polymer.

10. The method for production of the organic-inorganic composite as recited in claim 9, wherein said organometallic polymer has Si in the place of M and is obtained via hydrolysis and polycondensation of a silane compound having a photo- or thermally-polymerizable group and another silane compound having a phenyl group.

11. The method for production of the organic-inorganic composite as recited in claim 9, wherein said organometallic polymer has Si in the place of M and is obtained via hydrolysis and polycondensation of trialkoxysilane having a photo- or thermally-polymerizable group and dialkoxysilane having a phenyl group.

12. The method for production of the organic-inorganic composite as recited in claim 9, wherein said hydrophilic group in the acrylic monomer or oligomer is a hydroxyl group.

* * * * *